United States Patent [19]
Bosen et al.

[11] Patent Number: 5,106,261
[45] Date of Patent: * Apr. 21, 1992

[54] TURBINE WITH PLANETARY GEARING

[75] Inventors: Werner Bosen, Cologne; Hans-Dieter Denz, Weilerswist-Metternich, both of Fed. Rep. of Germany

[73] Assignee: Atlas Copco Energas GmbH, Cologne, Fed. Rep. of Germany

[*] Notice: The portion of the term of this patent subsequent to Jul. 30, 2008 has been disclaimed.

[21] Appl. No.: 482,957

[22] Filed: Feb. 20, 1990

[30] Foreign Application Priority Data

Mar. 4, 1989 [DE] Fed. Rep. of Germany ....... 3907058

[51] Int. Cl.$^5$ ............................................. F01D 15/12
[52] U.S. Cl. .................................................. 415/124.1
[58] Field of Search ........................ 415/122.1, 124.1; 475/331, 323

[56] References Cited

U.S. PATENT DOCUMENTS

| | | | |
|---|---|---|---|
| 1,648,479 | 11/1927 | Hilbert | 475/323 |
| 1,998,778 | 4/1935 | Gregg | 415/122.1 |
| 2,374,829 | 5/1945 | Nardone | 415/122.1 |
| 2,845,054 | 7/1958 | Palfreyman et al. | 415/122.1 |
| 3,214,990 | 11/1965 | Jekat | 415/124.1 |
| 3,498,424 | 3/1970 | Beneke et al. | 74/369 |

FOREIGN PATENT DOCUMENTS

| | | | |
|---|---|---|---|
| 1004929 | 3/1957 | Fed. Rep. of Germany | 415/122.1 |
| 370862 | 6/1959 | Switzerland | |
| 1101586 | 7/1984 | U.S.S.R. | 415/142 |
| 724531 | 6/1951 | United Kingdom | 415/122.1 |

*Primary Examiner*—Edward K. Look
*Assistant Examiner*—Hoang Nguyen
*Attorney, Agent, or Firm*—Herbert Dubno; Andrew Wilford

[57] ABSTRACT

A turbine has a housing, an impeller centered on and rotatable about an axis in the housing, and an axle assembly in the housing having a large-diameter mounting part and a small-diameter bearing stem centered on the axis and extending into the impeller. A sun gear traversed by the bearing stem is fixed to the impeller and forms with the impeller a rotor having a center of mass spaced axially a predetermined distance from the large-diameter mounting part. A ring gear rotatable in the housing about the axis around the sun gear meshes with planet gears rotatable on the housing about respective planet axes radially equispaced from and angularly equispaced about the impeller axis. Each planet gear meshes inwardly with the sun gear. A bearing supports the rotor on the stem of the axle assembly at a bearing location spaced from the large-diameter mounting part by a distance equal to between 0.4 and 1.2 times the predetermined distance between the center of mass and the mounting part.

3 Claims, 2 Drawing Sheets

TURBINE WITH PLANETARY GEARING

FIELD OF THE INVENTION

The present invention relates to a turbine. More particularly this invention concerns a turbine provided with planetary gearing.

BACKGROUND OF THE INVENTION

A standard turbine has a cantilevered impeller and a planetary transmission comprising a transmission housing, a rotating ring gear, a central axle, a sun gear, and at least three planet gears mounted on pins on the housing. Normally the impeller and the sun gear are carried on an output shaft that itself is supported in the housing in a bearing which is arranged between the impeller and the sun gear. Such a bearing takes up considerable space and is a difficult item to manufacture to the necessary tolerances. In addition for a given weight and mass of the impeller only a limited range of constructions are possible to influence the critical speed.

The result is that such turbines must be built to fairly limited standards. The known turbines, in particular radial-throughput ones, are run in a supercritical range at very high speeds so that an acceptable service life of the planetary gearing can only be obtained by mounting the output shaft on a bearing that is both cooled and lubricated by oil. Oil-lubricated bearings produce considerable friction at high speeds, which friction negatively affects turbine performance and requires an expensive oil-pumping and -cooling arrangement.

OBJECTS OF THE INVENTION

It is therefore an object of the present invention to provide an improved planetary-gear turbine.

Another object is the provision of such an improved planetary-gear turbine which overcomes the above-given disadvantages, that is which is of compact construction and which in a simple manner makes it possible to constructively influence the critical rotation speeds.

SUMMARY OF THE INVENTION

A turbine according to this invention has a housing, an impeller centered on and rotatable about an axis in the housing, and an axle assembly in the housing having a large-diameter mounting part and a small-diameter bearing stem centered on the axis and extending into the impeller. A sun gear traversed by the bearing stem is fixed to the impeller and forms with the impeller a rotor having a center of mass spaced axially a predetermined distance from the large-diameter mounting part. A ring gear rotatable in the housing about the axis around the sun gear meshes with planet gears rotatable on the housing about respective planet axes radially equispaced from and angularly equispaced about the impeller axis. Each planet gear meshes inwardly with the sun gear. In accordance with this invention a bearing supports the rotor on the stem of the axle assembly at a bearing location spaced from the large-diameter mounting part by a distance equal to between 0.4 and 1.2 times the predetermined distance between the center of mass and the mounting part.

With the construction according to this invention a second bearing on the small-diameter bearing stem of the output shaft is not needed. The sun wheel sitting amid three planet gears not only functions as a drive part, but also serves as a support for the rotor. For a predetermined operating speed the critical speed is changeable via the dimensions of the small-diameter bearing stem of the shaft as well as of the hub rotor, in particular its length, wall thickness, and diameter. In addition it is possible by appropriate selection of the bearing spacing in accordance with the invention to affect the critical rotation speed. As a result the critical speed can be varied considerably by simple constructive changes which do not affect the basic construction. A wide range of acceptable critical speeds can be obtained with low bearing speed. The result of this is that instead of the normally provided oil-lubricated bearing, roller bearings—normally a prestressed inclined ball or spindle bearing—can be used for supporting the rapidly rotating hub rotor. Even though it is within the scope of this invention to provide a sliding-type journal bearing on the reduced-diameter shaft part and to drive the turbine above the first critical rotation speed and at a high bearing speed, the preferred embodiment of the invention provides that the bearing supporting the hub rotor has at least one roller bearing and the bearing spacing is set in accordance with the dimensions of the central axle and of the hub rotor so that the drive speed lies at a certain distance from neighboring critical speeds. This arrangement, whereby the use of slide bearings is completely eliminated, is particularly simple and inexpensive to manufacture and operate and has very low losses.

According to another feature of this invention the bearing is a roller bearing and the distance between it and the mounting part is set in accordance with the dimensions of the axle assembly and rotor such that its drive speed is different from the critical rotation speed of the rotor.

The impeller according to this invention can be formed with a sleeve on which the sun gear is mounted directly. This maximizes the wall thickness around the central hole in the impeller to similarly increase its strength. Alternately the sun gear is formed with a sleeve on which the impeller is mounted directly.

DESCRIPTION OF THE DRAWING

The above and other objects, features, and advantages will become more readily apparent from the following, reference being made to the accompanying drawing in which.

SPECIFIC DESCRIPTION

Figure 1:
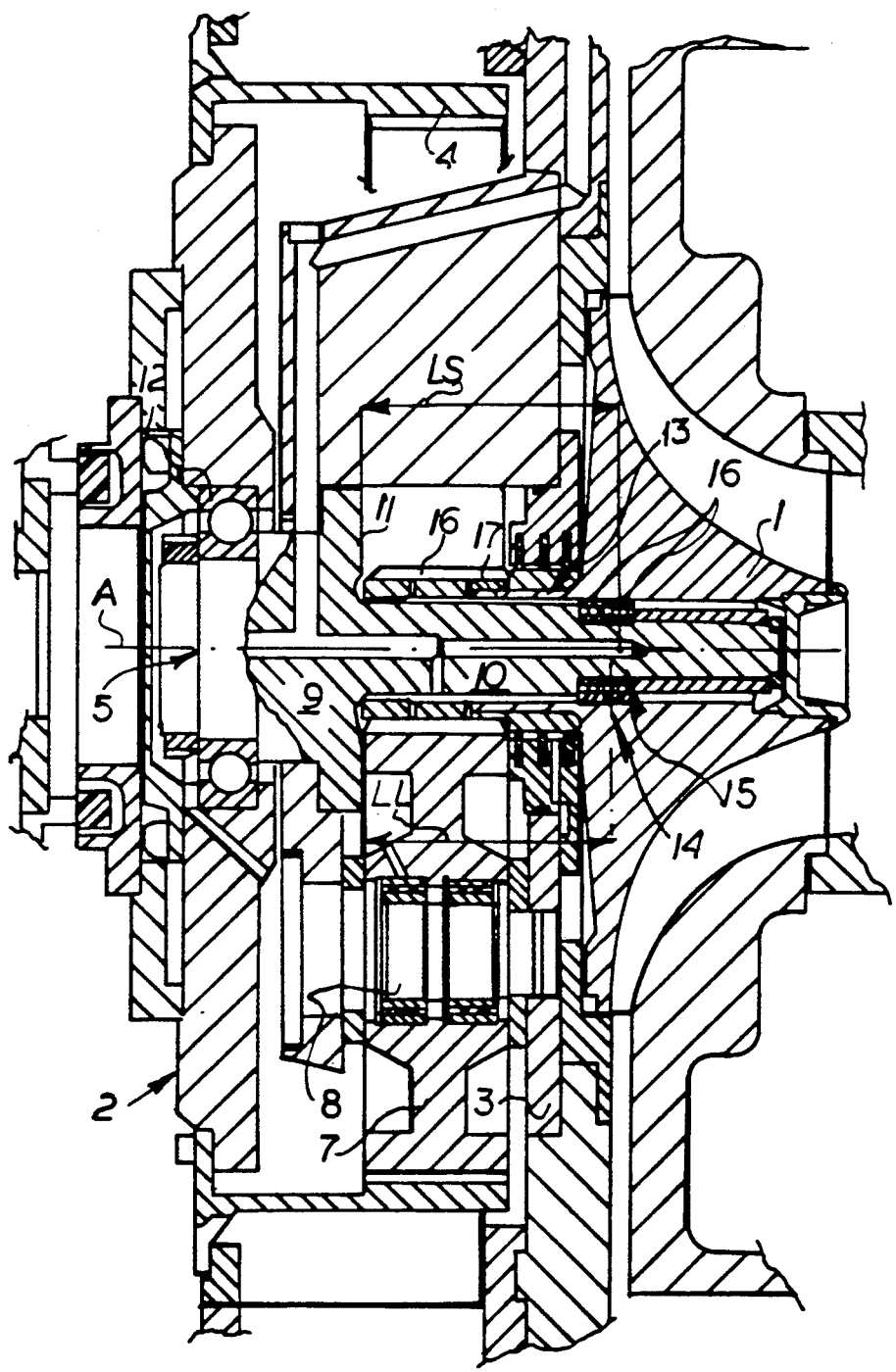
FIG. 1 is an axial section through a turbine according to this invention.

As seen in FIG. 1 an impeller 1 which is cantilevered, that is supported at only one end, is connected to a planetary transmission 2 comprised of a nonrotating housing 3, a ring gear 4 rotatable in the housing 3, a central axle assembly 5 fixed in the housing 3, a sun gear 6, and at least three planet gears 7. Bolts 8 fixed in the housing 3 support the planet gears 7 which are angularly equispaced about a central axis A of the transmission 2 and which mesh internally with the sun gear 6 and externally with the ring gear 4. This arrangement can be used as a pump or a motor, but either way relies on radial flow over vanes of the impeller 1 for conversion of fluid flow into rotation or vice versa.

The axle assembly 5 comprises a medium-diameter end part 9 supported by a bearing 12 in the ring gear 4, a small-diameter bearing stem 10 of cylindrical shape centered on the axis A, and a large-diameter flange 11 from which the part 9 and stem 10 project axially oppositely. The impeller 1 and sun gear 6 are fixed together to form a hub rotor 13 having a center of gravity or mass at 15. This rotor 13 is supported by a roller bearing 16 centered at 14 on the axle assembly 5.

According to the invention the bearing center 14 is spaced along the stem 10 from its attachment location to the flange part 11 by a distance LL equal to between 0.4 and 1.2 times the distance LS by which the center of mass 15 is spaced from this part 11. This bearing 16, which here is a double prestressed inclined-roller bearing, is in the illustrated embodiment very close to the center of mass 15. The operation speed of the turbine is different from its critical rotation speed.

In the arrangement of FIG. 1 the impeller 1 is unitarily formed with a sleeve 17 on which the sun gear 6 is directly mounted. This arrangement is advantageous for a wide range of operation speeds.

Figure 2:
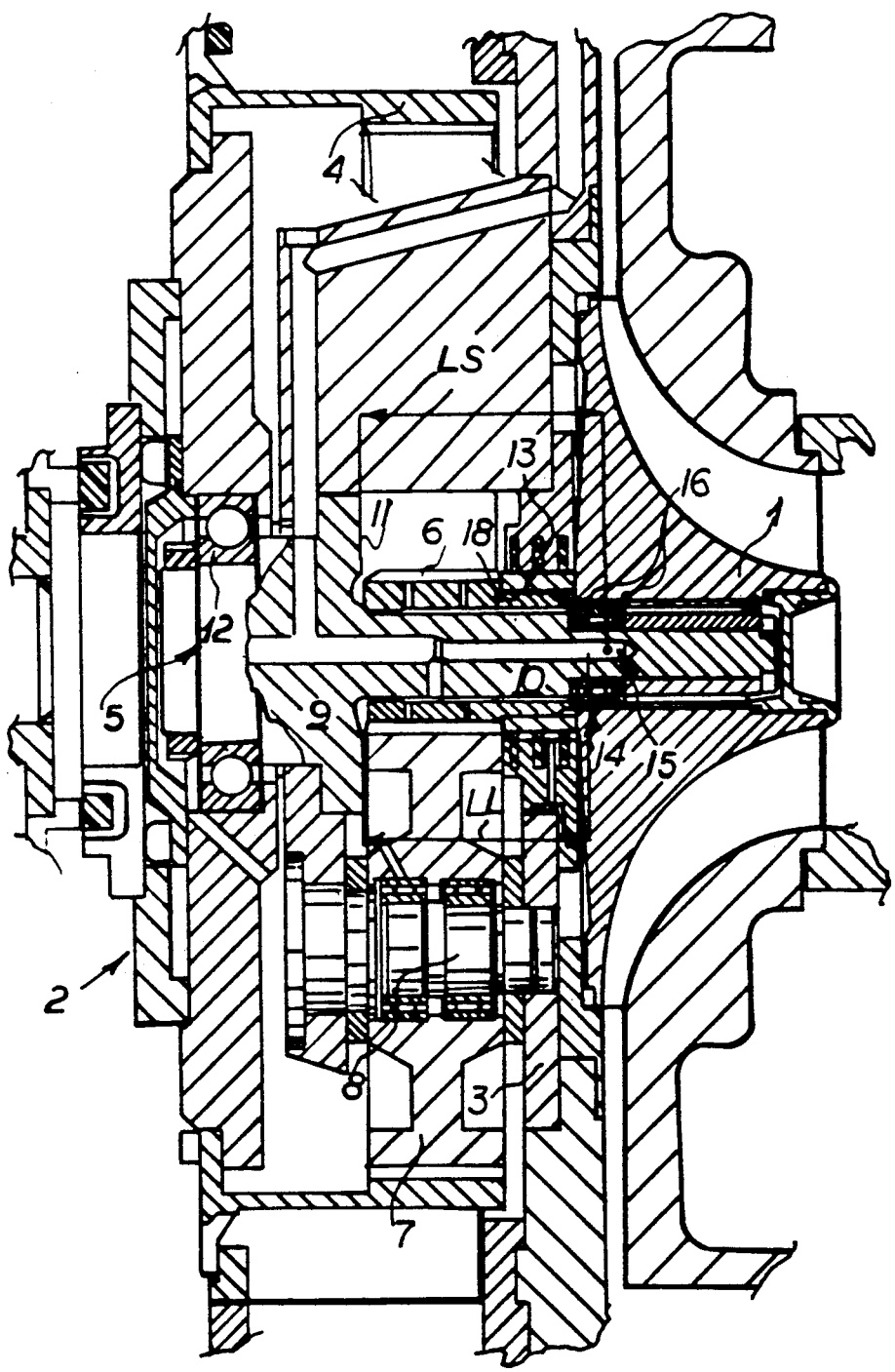
FIG. 2 is a view like FIG. 1 of another turbine in accordance with the invention.

FIG. 2 shows an arrangement for use where the impeller 1 is subjected to less centrifugal force. Here the impeller 1 is carried on a sleeve 18 formed unitarily with the sun gear 6 and carrying the bearing 16.

We claim:

1. A turbine adapted to run at a predetermined drive speed and comprising:

a housing;

a cantilevered impeller centered on and rotatable about an axis in the housing;

an axle assembly in the housing having a large-diameter mounting part, and a small-diameter bearing stem fixed to the mounting part, centered on the axis, and extending into the impeller;

a sun gear traversed axially by the bearing stem, fixed to the impeller between same and the large-diameter mounting part of the axle assembly, and forming with the impeller a rotor having a center of mass spaced axially a predetermined distance from the large-diameter mounting part and formed centered on the axis with a bore coaxially receiving the bearing stem;

a ring gear rotatable in the housing about the axis around the sun gear;

a roller bearing rotatably supporting the ring gear on the large-diameter part of the axle assembly;

at least three planet gears rotatable on the housing about respective planet axes radially equispaced from and angularly equispaced about the impeller axis, each planet gear meshing inwardly with the sun gear and outwardly with the ring gear; and a rotor bearing in the bore rotatably supporting the rotor on the stem of the axle assembly at a bearing location spaced from the large-diameter mounting part by a distance equal to between 0.4 and 1.2 times the predetermined distance between the center of mass and the mounting part, the distance between the bearing location and the mounting part being such that the critical rotation speed of the turbine is different from the drive speed of the turbine.

2. The turbine defined in claim 1 wherein the impeller is formed with a sleeve on which the sun gear is mounted directly.

3. The turbine defined in claim 1 wherein the sun gear is formed with a sleeve on which the impeller is mounted directly.

* * * * *